United States Patent
Kramlich

(10) Patent No.: US 10,254,468 B2
(45) Date of Patent: Apr. 9, 2019

(54) DISPLAY DEVICE WITH BACKLIT MULTIPLE SYMBOLS

(71) Applicant: Preh GmbH, Bad Neustadt a.d. Saale (DE)

(72) Inventor: Andreas Kramlich, Bad Neustadt a.d. Saale (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 137 days.

(21) Appl. No.: 15/344,409

(22) Filed: Nov. 4, 2016

(65) Prior Publication Data
US 2017/0131461 A1 May 11, 2017

(30) Foreign Application Priority Data

Nov. 6, 2015 (DE) .......................... 10 2015 119 107
Mar. 15, 2016 (DE) .......................... 10 2016 104 708

(51) Int. Cl.
*F21V 8/00* (2006.01)

(52) U.S. Cl.
CPC .......... *G02B 6/0076* (2013.01); *G02B 6/0035* (2013.01); *G02B 6/0068* (2013.01); *G02B 6/006* (2013.01)

(58) Field of Classification Search
CPC ... G02B 6/0076; G02B 6/0035; G02B 6/0068
See application file for complete search history.

(56) References Cited

U.S. PATENT DOCUMENTS

| | | | |
|---|---|---|---|
| 2013/0141937 A1* | 6/2013 | Katsuta ................. | G02B 6/005 362/606 |
| 2013/0155723 A1* | 6/2013 | Coleman .............. | G02B 6/0018 362/621 |

* cited by examiner

*Primary Examiner* — Anabel Ton
(74) *Attorney, Agent, or Firm* — Walter | Haverfield LLP; Sean F. Mellino; D. Peter Hochberg

(57) ABSTRACT

A display device is provided. The display device comprises a display surface with several segments that can be backlit, which are configured in such a way that, if subsets of the segments are backlit together, a different one of several symbols is in each case depicted by the display surface, a number of light sources corresponding to the number of symbols, a layer structure of several flat light transmitting layers made of a transparent or translucent material, preferably plastic, wherein the light transmitting layers are stacked with the main surfaces facing each other and are in each case configured in such a way that, primarily, light of exactly one of the light sources is transmitted from a narrow side of the light transmitting layer provided for light entrance to another narrow side of the light transmitting layer as a light exit to at least one segment of the associated symbol.

15 Claims, 6 Drawing Sheets

DISPLAY DEVICE WITH BACKLIT MULTIPLE SYMBOLS

CROSS-REFERENCE TO RELATED APPLICATION

This application claims foreign priority of German application Serial Numbers DE 10 2015 119 107.5 filed on Nov. 6, 2015 and DE 10 2016 104 708.2 filed on Mar. 15, 2016, the entireties of which are incorporated herein by reference.

BACKGROUND OF THE INVENTION

Field of the Invention

The invention relates to a display device for depicting several, preferably different, symbols on a display surface.

It is known to realize this object by means of an electronic display, such as a liquid crystal display. This approach is comparatively complex and expensive; in particular, despite immense developments in this field, the quality of depiction is still strongly dependent on the ambient conditions and the viewing angle, and a comparatively large effort must be made in order to prevent the symbol from "burning in" in the case of a small variety of depictions and a long displaying duration.

Against this background, there is a demand for a display device that is simple to produce, with the option of displaying several backlit different symbols with a comparatively simple structure that is easy to produce.

SUMMARY OF THE PRESENT INVENTION

This object is achieved by a display device according to claim 1. Advantageous embodiments are in each case the subject matter of the dependent claims. An equally advantageous use is the subject matter of the independent claim. It must be noted that the features cited individually in the claims can be combined with each other in any technologically meaningful manner and represent other embodiments of the invention. The description, in particular in connection with the figures, additionally characterizes and specifies the invention.

The display device has a display surface with several segments that are capable of being backlit and are, for example, line-shaped or strip-shaped. The segments are configured, i.e. disposed and/or shaped, in such a way that, if subsets of the segments are backlit together, a different one of several symbols is in each case depicted by the display surface, at least viewed from a distance. Preferably, the segments are disposed alternatingly with regard to their association with the symbols. However, the individual segments are, for example, not necessarily configured in a uniform manner. In one embodiment, the effect interfering with the overall impression, which is due to the separation into segments, is counteracted by a diffuser layer on the display surface. The display device according to the invention has a number of light sources corresponding to the number of symbols. According to the invention, a layer structure of several flat light transmitting layers made of a transparent or translucent material, preferably plastic, is provided. A flat configuration in the sense of the invention means a dimension perpendicular to the main surface, also referred to as thickness, that falls short of the dimensions in the direction parallel to the main surface, and which is, for example, smaller by a factor 5, preferably more than the factor 10, than the maximum dimension in the direction parallel to the main surface. According to the invention, the light transmitting layers are stacked with the main surfaces facing each other. For example, the main surfaces are disposed orthogonally to the display surface. According to the invention, the light transmitting layers are each configured in such a way that, primarily, light of exactly one of the light sources is transmitted from a narrow side of the light transmitting layer as a light entrance to another narrow side of the light transmitting layer as a light exit to at least one segment of the associated symbol. This primary transmission of the associated light source is understood to mean that an exclusive transmission of the associated light source is intended, but that a primary transmission of the associated light source is considered to be realized also if the light intensity of the associated light source present at the narrow side facing towards the display surface is higher than the light intensity caused by the other light sources, possibly by scattering effects; preferably, the light intensity of the associated light source is at least twice as high. Because of the configuration according to the invention, the display device is simple and cost-effective to realize.

The narrow sides of all light transmitting layers which face towards the display surface are preferably disposed in a common surface or plane. The respective narrow sides follow a common contour, for example.

Preferably, the narrow sides facing towards the associated light sources are disposed in a common plane or surface.

Advantageously, the remaining narrow sides are parallel or inclined with respect to the perpendicular onto the display surface in order to reflect light in the direction of the display surface by means of reflection.

In order to avoid "crosstalk" between the light transmitting layers, i.e. a scattering of light from one light transmitting layer into the other, at least one opaque, such as metallic, intermediate layer is preferably provided. Still more preferably, a metallic intermediate layer adjacent to the light transmitting layer is provided in order to improve the light transmission in the light transmitting layer, for example by means of an improved total reflection. For example, this layer is applied to the main surfaces by chemical and/or physical coating methods. The layers of the layer structure are preferably attached to each other by non-positive or substance-to-substance connection, for example by gluing or welding. Preferably, at least one adhesive layer is provided between the light transmitting layers.

In order to simplify the production of the display device, the outer shape of the light transmitting layers associated with a light source, preferably of all light transmitting layers, is identical.

Preferably, the light transmitting layers are further configured to be axisymmetric. In another embodiment, they can be transferred from a first position into a second position at least by rotation, so that the first position is axisymmetric to the second position.

In a simple embodiment, all of the light transmitting layers are stacked so as to be aligned, i.e. congruent.

Preferably, the light transmitting layers of the latter embodiment each have one non-masked narrow side portion facing towards the associated light source and, in each case, one masked narrow side portion facing towards the non-associated light sources, for example a portion provided with a masking layer made from an opaque paint, in order thus to primarily transmit the light of one of the light sources.

With respect to their association with the light sources, the light transmitting layers are stacked and/or formed in such a way that narrow sides are provided that are adjacent to and facing towards only one light source in each case.

Preferably, for each light source, one associated stack of light transmitting layers stacked in a congruent manner is provided.

Preferably, the sequence of the light transmitting layers in the layer structure is alternating with respect to their association with the light sources. For example, the layer structure of alternating stacks of light transmitting layer is formed with light transmitting layers that are only stacked in a congruent manner per stack.

In one embodiment, the several light sources differ in their light color. Preferably, the material of the light transmitting layers is colored so as to vary with respect to the association with the light sources, i.e. the light color of the several light transmitting layers associated with one light source differs from that of light transmitting layers associated with another light source.

Preferably, the narrow side of the light transmitting layer facing towards the respective light source is formed on an end of the light transmitting layer that protrudes over the adjacent layers, whereby the light sources, or the narrow sides provided therefor, can be disposed spaced farther apart in order to avoid crossfeeds.

Preferably, at least one of the light transmitting layers has an end protruding over the adjacent layers and having a curvature in order to approach over its extent an adjacent light transmitting layer that is also associated with the same light source, and in order to adjoin, for example, the associated intermediate layer, if provided.

Preferably, a light barrier, for example a web of opaque material, is disposed between the light sources.

Preferably, the segments of the display surface are defined by a masking layer, which is applied, for example, to the narrow side of the light transmitting layer facing towards the display surface, or is applied to a transparent or translucent display layer associated with the display surface. For example, a masking layer is provided by a paint layer into which through holes defining the segments are introduced by laser ablation.

The invention further relates to a control element, such as a button or rotary adjuster, which has a display device in one of the above-described embodiments. Preferably, the display surface is defined by an outer surface of the operating part of the control element.

The invention further relates to an advantageous use of the display device in one of the above-described embodiments in a motor vehicle.

BRIEF DESCRIPTION OF THE DRAWINGS

This and other objects, advantages and features of the invention will become obvious from the following detailed description of preferred exemplary embodiments of the invention in conjunction with the drawings, without the invention being limited thereto. In the drawings.

DETAILED DESCRIPTION OF THE PRESENT INVENTION

Figure 1:
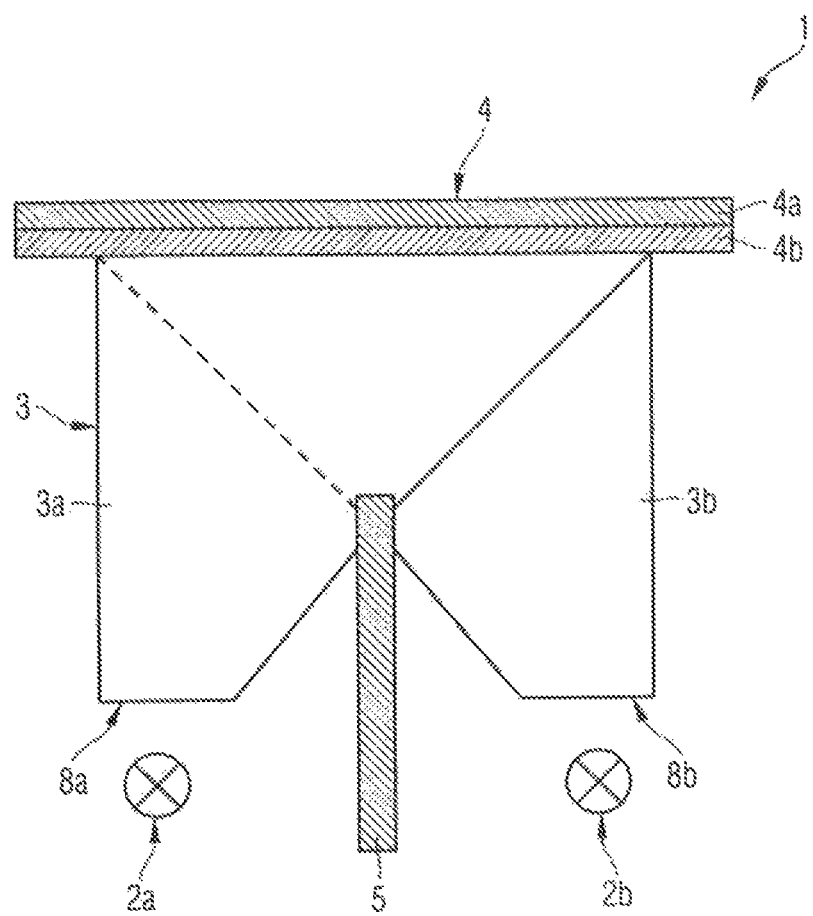
FIG. 1 shows a sectional view through a first embodiment of a display device according to the invention.
Figure 2C:
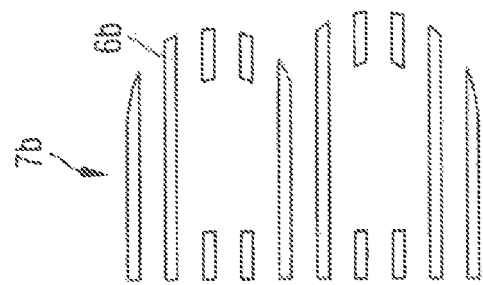
FIGS. 2a to 2c show the symbols displayed on the display surface by backlighting different subsets of segments.
Figure 2B:
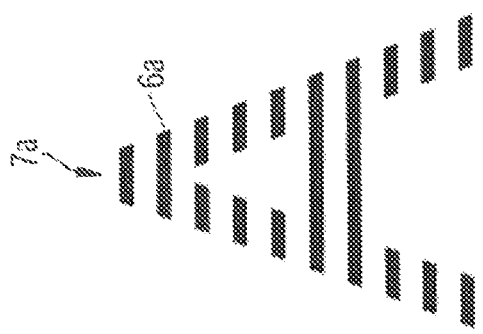
Figure 2A:
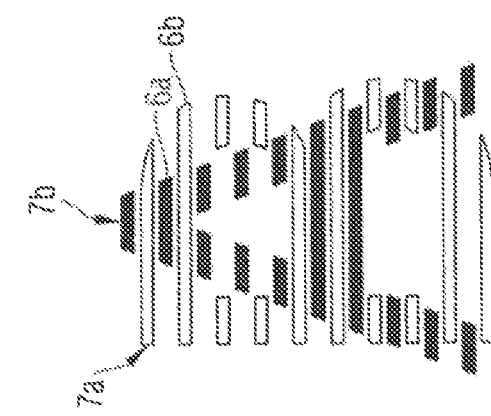

FIG. 1 shows a first embodiment of the display device 1 according to the invention in a sectional view. It has a display surface 4 facing towards an observer, possibly also the operator, who is not shown. This display surface 4 is defined by an external display layer 4, which in this case is colored in a diffuse manner and thus translucent. In order to depict different symbols on this display surface 4, a masking layer 4b is provided, which defines several light-transmissive segments, which cannot be seen in the perspective chosen in FIG. 1 and which are explained below based on the FIGS. 2a to 2c. Two light sources 2a and 2b, which are disposed spaced apart from each other and equidistant from the display surface 4, and which are each provided for alternatingly backlighting one of the two symbols that are to be depicted by backlighting subsets of segments, are disposed on the side of the display surface 4 facing away from the operator. A layer structure 3 of alternatingly disposed light transmitting layers 3a, 3b made from transparent plastic material, which are respectively configured for light transmission from one of the two light sources 2a or 2b to an associated segment of the symbol to be depicted, is provided between the display surface 4 and the light sources 2a and 2b. In order to avoid any scattering of light into the respective non-associated light transmitting layers 3a or 3b, a light barrier 5, which extends into a recess of the layer structure 3 and is made from an opaque plastic material, is provided between the light sources 2a, 2b. As is apparent from the FIGS. 2a to 2c, if only one (2a) of the light sources is activated, a subset of segments 6a is backlit and thus, the symbol A is depicted in a backlit manner, as is shown in FIG. 2b, whereas, if the other (2b) of the light sources is exclusively activated, another subset of segments 6b is backlit, and thus the symbol B is displayed, as is shown in FIG. 2c. Accordingly, FIG. 2a shows, only for illustration purposes, the case of a simultaneous activation of both light sources 2a and 2b, which is unusual in the practical application of the display device according to the invention, during which both symbols 7a and 7b are depicted simultaneously on the display surface.

FIG. 3 shows the layer structure 3 of the invention in accordance with the first embodiment in detail. With respect to the association with the light sources, the layer structure 3 has in each case several light transmitting layers 3a or 3b, each of which are made to be congruent, in accordance with the association with the light sources, with main surfaces facing each other, and stacked alternatingly. The light transmitting layers 3a serve for the light transmission from a narrow side 8a facing towards the light source 2a as a light-entrance surface to an opposite narrow side 10a, which faces towards the display surface, as a light-exit surface, whereas the light transmitting layers 3b serve for the light transmission from a narrow side 8b facing towards the other light source 2b as a light-entrance surface to an opposite narrow side 10b, which faces towards the display surface, as a light-exit surface. In order to suppress a transition of light from one light transmitting layer 3a, 3b to the respective adjacent light transmitting layers, an opaque layer 9 is provided between them. Further, in the case shown, this is an adhesive layer 9 for the substance-to-substance connection of the light transmitting layers 3a, 3b.

Figure 3A:
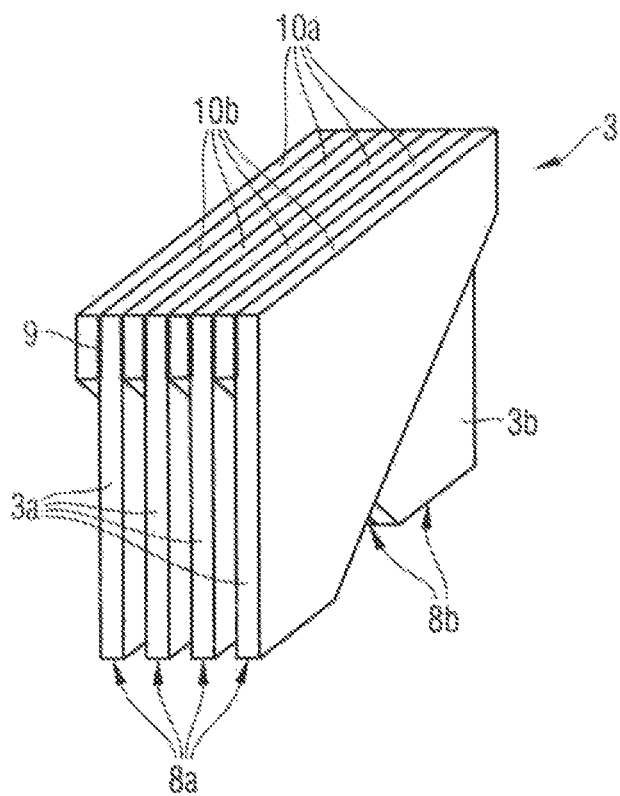
FIG. 3a shows a perspective view of the layer structure 3 of the embodiment shown in FIG. 1.

As is apparent from FIG. 3a, the narrow sides 10a, 10b provided for light exit and light transition to the display surface are disposed in a common plane in order to be capable of being disposed adjacent to the layer 4b of FIG. 1. In comparison with the light transmitting layers 3a, the light transmitting layers 3b are arranged in such a way that their narrow sides 10a and 10b provided for light exit are situated directly next to each other, their narrow sides 8a or 8b provided for light entrance are spaced apart, in order to be capable of being disposed adjacent to the associated light sources 2a or 2b in each case, as shown in FIG. 1. At this location, the light transmitting layers 3a and 3b form an air gap between them in each case, so that the entire layer structure 3 forms comb-like appendages facing towards the respective light sources 2a or 2b.

Figure 3B:
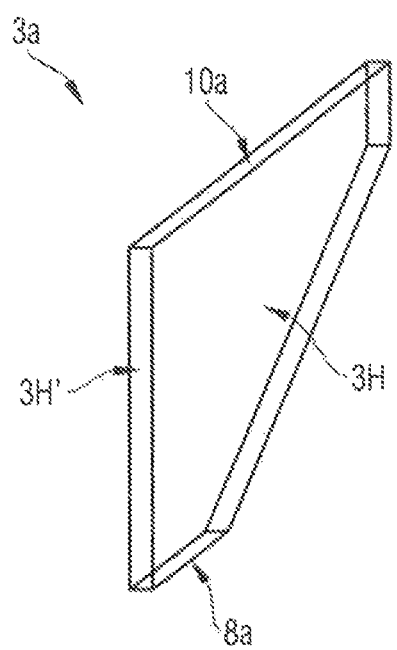
FIG. 3b shows a perspective view of a light transmitting layer of the layer structure 2 of the embodiment shown in FIG. 1.

The shape of the light transmitting layer 3a is illustrated with reference to FIG. 3b. The light transmitting layer 3a is a flat structure. The narrow sides remaining besides those for light entrance 8a and light exit 10a are arranged either perpendicular or inclined relative to the above-mentioned narrow sides, and thus to the display surface 4, of FIG. 1, whereas the main surfaces 3H' and 3H serve for an adjacent arrangement to the light transmitting layers 3b. All of the light transmitting layers 3a and 3b are configured identically and, with regard to the layer structure 3 of FIG. 3a, differ in the way they are stacked.

Figure 4:
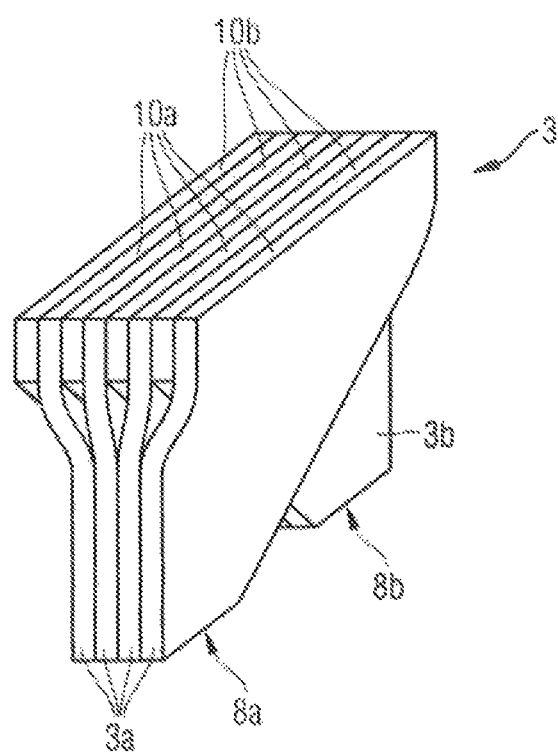
FIG. 4 shows a perspective view of a layer structure 3 of a second embodiment of the display device according to the invention.

Essentially, the second embodiment of the layer structure e 3 shown in FIG. 4 differs from the first embodiment shown in FIG. 3a in that, avoiding the comb-like appendages of the first embodiment, the ends that face towards the respective light sources and form the narrow sides 8a or 8b provided for light entrance are curved so as to nestle up against each other, so that they form a joint, closed light-entrance surface.

Figure 5:
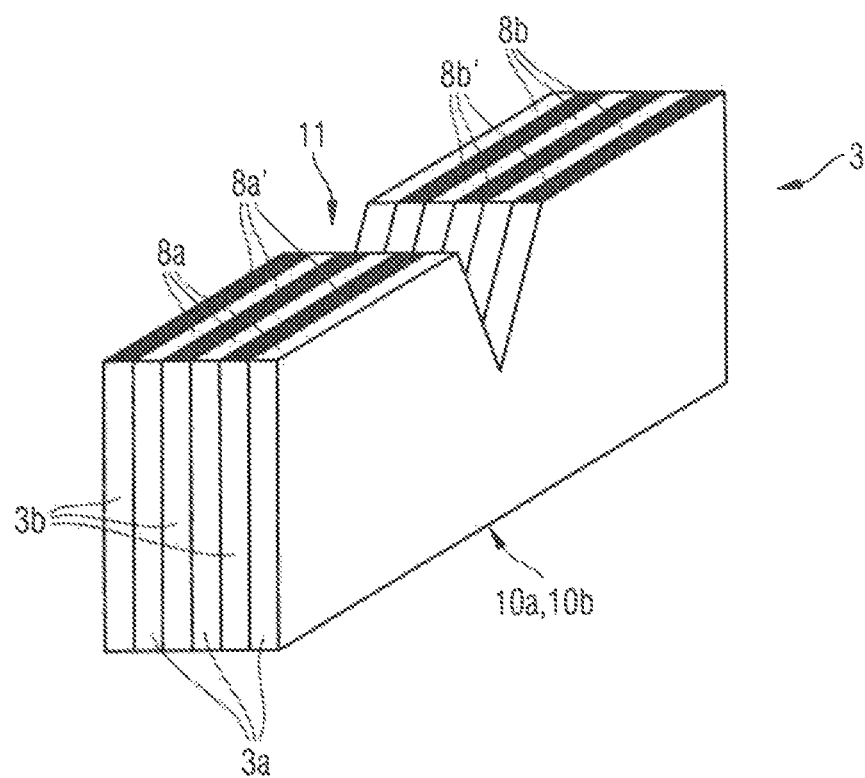
FIG. 5 shows a perspective view of a layer structure 3 of a third embodiment of the display device according to the invention.

The third embodiment of the layer structure 3 shown in FIG. 5 has congruently stacked light transmitting layers 3a and 3b, with the respective association with the light sources 2a and 2b of FIG. 1 resulting solely from the respective narrow side portions facing towards and adjacent to the light sources either being masked, like the narrow side portions 8a' and 8b', or non-masked, like the narrow side portions 8a and 8b. The V-shaped incision 11, which is provided centrally between the narrow sides 8a', 8b' or 8a, 8b that are differently coated or uncoated in accordance with the association with the light sources, results in a guidance of the light in the respective light transmitting layers 3a and 3b.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A display device, comprising a display surface with several segments that can be backlit, which are configured in such a way that, if subsets of the segments are backlit together, a different one of several symbols is in each case depicted by the display surface, a number of light sources corresponding to the number of symbols, a layer structure of several flat light transmitting layers made of a transparent or translucent material, preferably plastic, wherein the light transmitting layers are stacked with the main surfaces facing each other and are in each case configured in such a way that, primarily, light of exactly one of the light sources is transmitted from a narrow side of the light transmitting layer provided for light entrance to another narrow side of the light transmitting layer as a light exit to at least one segment of the associated symbol and wherein the light transmitting layers each have one non-masked narrow side portion facing towards the associated light source and one masked narrow side portion facing towards the respective non-associated light source, in order to primarily transmit the light of one of the light sources.

2. The display device according to claim 1, wherein at least one opaque, such as metallic, intermediate layer is provided between the light transmitting layers.

3. The display device according to claim 1, wherein at least one adhesive layer is provided between the light transmitting layers.

4. The display device according to claim 1, wherein the outer shape of the light transmitting layers associated with a light source, preferably of all light transmitting layers, is identical.

5. The display device according to claim 1, wherein the light transmitting layers are moreover configured to be axisymmetric.

6. The display device according to claim 1, wherein all light transmitting layers are stacked in a congruent manner.

7. The display device according to claim 1, wherein, for each light source, one associated stack of associated light transmitting layers disposed in a congruent manner is provided.

8. The display device according to claim 1, wherein, with respect to their association with the light sources, the light transmitting layers are stacked and/or formed in such a way that narrow sides are provided that are adjacent to and facing towards only one light source in each case.

9. The display device according to claim 1, wherein the sequence of the light transmitting layers in the layer structure is alternating with respect to the association with the light sources.

10. The display device according to claim 1, wherein the material of the light transmitting layers is colored in a varying manner with respect to the association with the light sources.

11. The display device according to claim 1, wherein the narrow side of the light transmitting layer facing towards the respective light source is formed on an end of the light transmitting layer that protrudes over the adjacent light transmitting layers.

12. The display device according to claim 1, wherein at least several of the light transmitting layers have an end protruding over the adjacent layers that has a curvature in order to approach or nestle against an adjacent light transmitting layer that is also associated with the same light source.

13. The display device according to claim 1, wherein a light barrier is provided between the light sources.

14. The display device according to claim 1, wherein a masking layer defines the segments of the display surface, which is applied to the narrow side of the light transmitting layer facing towards the display surface, or is applied to a transparent or translucent display layer associated with the display surface.

15. Use of the display device according to claim 1 in a motor vehicle.

* * * * *